United States Patent
Morita et al.

(10) Patent No.: US 11,893,873 B2
(45) Date of Patent: Feb. 6, 2024

(54) INFORMATION COLLECTION APPARATUS, COMPUTER-READABLE RECORDING MEDIUM, AND INFORMATION COLLECTION METHOD

(71) Applicant: YOKOGAWA ELECTRIC CORPORATION, Tokyo (JP)

(72) Inventors: Ryuusuke Morita, Tokyo (JP); Ryuji Kobayashi, Tokyo (JP); Wataru Kinoshita, Tokyo (JP); Satoru Akiyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 87 days.

(21) Appl. No.: 17/670,021

(22) Filed: Feb. 11, 2022

(65) Prior Publication Data

US 2022/0270469 A1    Aug. 25, 2022

(30) Foreign Application Priority Data

Feb. 22, 2021 (JP) .................. 2021-026518

(51) Int. Cl.
*G08B 23/00* (2006.01)
*H04Q 9/00* (2006.01)

(52) U.S. Cl.
CPC ............ *G08B 23/00* (2013.01); *H04Q 9/00* (2013.01)

(58) Field of Classification Search
CPC ...... G08B 23/00; G05B 19/4184; H04Q 9/00; H04Q 2209/823
See application file for complete search history.

(56) References Cited

U.S. PATENT DOCUMENTS

| 10,366,348 | B2* | 7/2019 | Kang | G06F 16/00 |
| 2006/0081697 | A1* | 4/2006 | Brinton | G07C 5/008 |
| | | | | 702/182 |
| 2014/0148922 | A1* | 5/2014 | Nakagami | G05B 23/0262 |
| | | | | 700/9 |
| 2015/0205658 | A1* | 7/2015 | Towata | G06F 11/30 |
| | | | | 714/47.3 |
| 2018/0224831 | A1* | 8/2018 | Liu | G05B 23/0232 |
| 2018/0314238 | A1* | 11/2018 | Fujita | G05B 19/4184 |
| 2018/0314243 | A1* | 11/2018 | Fujita | G05B 13/0265 |
| 2020/0090424 | A1* | 3/2020 | Honda | G08C 15/00 |

(Continued)

FOREIGN PATENT DOCUMENTS

| JP | 2000-293401 | A | 10/2000 |
| JP | 2010-165136 | A | 7/2010 |
| JP | 2010165136 | A * | 7/2010 |

(Continued)

OTHER PUBLICATIONS

Japanese Office Action (JPOA) dated Dec. 20, 2022 for Japanese Patent Application No. 2021-026518; English machine translation.

*Primary Examiner* — Adnan Aziz
(74) *Attorney, Agent, or Firm* — RANKIN, HILL & CLARK LLP

(57) ABSTRACT

An information collection apparatus includes a receiving unit that receives an alarm indicating an abnormality related to a control station that is for a plant, and a collection unit that collects investigation information on a cause of the alarm from a part of the control station, where the part is identified based on the alarm received by the receiving unit.

20 Claims, 10 Drawing Sheets

(56) References Cited

U.S. PATENT DOCUMENTS

2022/0155100 A1* 5/2022 Anderson ............. G01D 4/004
2022/0230526 A1* 7/2022 Akatsuka ............ G05B 23/027

FOREIGN PATENT DOCUMENTS

| JP | 2016-103110 A | 6/2016 |
|---|---|---|
| JP | 2019-179506 A | 10/2019 |
| JP | 6604455 B1 | 11/2019 |

* cited by examiner

INFORMATION COLLECTION APPARATUS, COMPUTER-READABLE RECORDING MEDIUM, AND INFORMATION COLLECTION METHOD

CROSS-REFERENCE TO RELATED APPLICATION

The present application claims priority to and incorporates by reference the entire contents of Japanese Patent Application No. 2021-026518 filed in Japan on Feb. 22, 2021.

FIELD

Embodiments of the present invention relate to an information collection apparatus, a computer-readable recording medium, and an information collection method.

BACKGROUND

For example, Japanese Patent No. 6604455 discloses an apparatus that manages an alarm indicating an abnormality related to a control station for a plant.

Conventionally, upon receiving an alarm, an engineer visits an actual site and collects information for investigating a cause of the alarm. In this case, for example, it takes time for the engineer to move to the site, so that it may be difficult to collect appropriate information in a timely manner or it may be difficult to move to the site due to an environmental condition or the like. Therefore, there is a need for a technology for effectively collecting information.

SUMMARY

According to one aspect of the present invention, it is possible to effectively collect information for investigating a cause of an alarm that indicates an abnormality related to a control station for a plant.

According to one aspect of embodiments, an information collection apparatus comprises a receiving unit that receive an alarm indicating an abnormality related to a control station that is for a plant; and a collection unit that collects investigation information on a cause of the alarm from a part of the control station, the part being identified based on the alarm received by the receiving unit.

According to one aspect of embodiments, a computer-readable recording medium stores therein an information collection program that causes a computer to execute: receiving an alarm indicating an abnormality related to a control station that is for a plant; and collecting investigation information on a cause of the alarm from a part of the control station, the part being identified based on the received alarm.

According to one aspect of embodiments, an information collection method comprises receiving, by an information collection apparatus, an alarm indicating an abnormality related to a control station that is for a plant; and collecting, by the information collection apparatus, investigation information on a cause of the alarm from a part of the control station, the part being identified based on the received alarm.

DESCRIPTION OF EMBODIMENTS

Embodiments will be described below with reference to the drawings. The same components are denoted by the same reference symbols, and the same explanation will be omitted appropriately.

Figure 1:
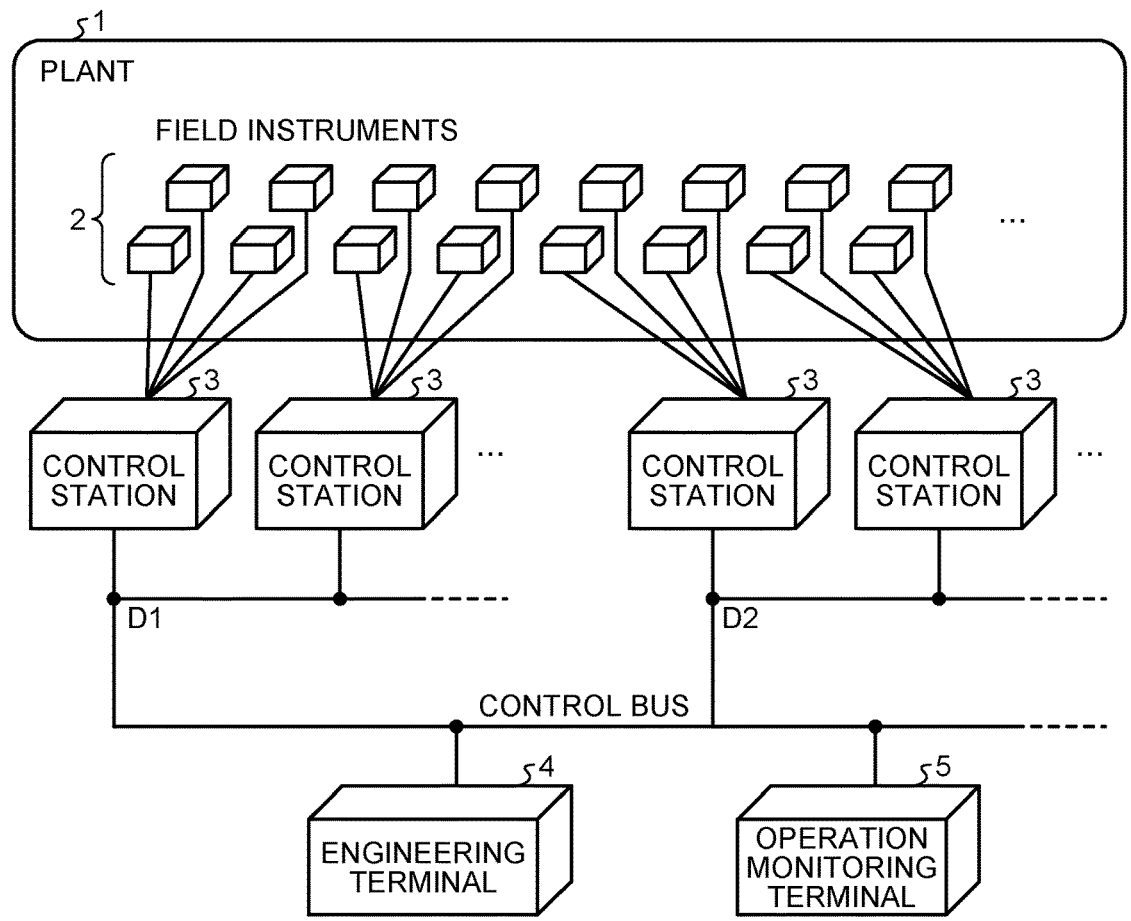
FIG. 1 is a diagram illustrating an example of a schematic configuration of an information collection apparatus according to an embodiment.

FIG. 1 is a diagram illustrating an example of a schematic configuration of an information collection apparatus according to one embodiment. The information collection apparatus according to one embodiment will be referred to and illustrated as an operation monitoring terminal 5. The operation monitoring terminal 5 is used for monitoring or the like of a plant 1.

The plant 1 is a factory or the like that includes various facilities for obtaining products. Examples of the products include liquefied natural gas (LNG), resin (plastic, nylon, and the like), and chemical products. Examples of the facilities include factory facilities, mechanical facilities, production facilities, power generation facilities, storage facilities, and facilities at wellheads at which oil, natural gas, or the like is extracted.

Field instruments 2 are arranged at various places in the plant 1. The field instruments 2 are configured to be able to communicate with other apparatuses, such as control stations 3, by wireless communication and/or wire. The field instruments 2 are roughly divided (classified) into sensor instruments and manipulator instruments, for example. The sensor instruments are, for example, instruments for obtaining (detecting, measuring, or the like) physical quantities. Examples of the sensor instruments include pressure sensors, temperature sensors, flow sensors, pH sensors, velocity sensors, and acceleration sensors. The manipulator instruments are, for example, instruments for manipulating physical quantities. Examples of the manipulator instruments include valves, pumps, and fans. The manipulator instruments are driven by motors, actuators, and the like.

The control stations 3 are plant control stations for controlling the plant 1. Examples of the control include operation control on the plant 1. The control stations 3 as described above may also be referred to as operation control apparatuses, or the like. For example, the control stations 3 control operation of the plant 1 such that the plant 1 operates in a desired state.

Examples of the operation control will be described below. For example, the control stations 3 control a manipulated variable MV such that a process variable PV approaches a set point variable SV. The process variable PV is data indicating a status of a process in the plant 1. The process variable PV is acquired by, for example, the corresponding field instrument 2. Examples of the process variable PV include pressure, temperature, flow, pH values, velocity, and acceleration. The set point variable SV is data (target value) indicating a target of the process variable PV in the plant 1. The set point variable SV is given to, for example, the control stations 3, and supplied for control of the plant 1. Examples of the set point variable SV include, similarly to the process variable PV, pressure, temperature, flow, pH, velocity, and acceleration. The manipulated variable MV is data indicating manipulation in the plant 1. The manipulated variable MV is acquired from the corresponding field instrument 2 or given to the corresponding field instrument 2 from the control station 3, for example. The field instrument 2 operates in accordance with the given manipulated variable MV. Examples of the manipulated variable MV include a valve manipulated amount (for example, valve position), a pump manipulated amount, and a fan manipulated amount.

As illustrated in FIG. 1, the plurality of control stations 3 may be arranged for the plant 1. Each of the control stations 3 is responsible for operation control on a corresponding part of the plant 1. For example, each of the control stations 3 acquires data from the corresponding field instrument 2 and transmits data to the corresponding field instrument 2. The number of the control stations 3 and the number of the corresponding field instruments 2 for each of the control stations 3 may be determined arbitrarily. The control stations 3 and the field instruments 2 may have one-to-one correspondence. Meanwhile, each of the control stations 3 may be arranged in the plant 1.

An engineering terminal 4 and the operation monitoring terminal 5 are communicably connected to the control stations 3. In this example, the control stations 3, the engineering terminal 4, and the operation monitoring terminal 5 are connected to one another via a control bus. The control bus is a dedicated bus (also referred to as a network or the like) that is constructed for data transfer.

Some of data transferred by the control bus are used for control of the plant 1. The control may include real-time control. It is extremely important to prevent a defect, such as missing, in data transfer through the control bus. The control bus is, for example, a special network that is specially constructed, and is duplicated from the viewpoint of improvement in reliability (also see FIG. 3 to be described later). The duplicated control buses may transmit and receive the same data in parallel by using two communication paths. Even if a defect or the like occurs in one of the communication paths, data transfer (transmission and reception) can be maintained. Examples of the network that constructs the control bus as described above include Vnet/IP (registered trademark).

The plurality of control stations 3 may be divided and arranged for each of domains of the control bus. For example, one or more of the control stations 3 are separately housed in a room corresponding to each of the domains of the control bus. Some of the domains of the control bus are illustrated as a domain D1 and a domain D2. In this example, two or more of the control stations 3 are associated with each of the domain D1 and the domain D2.

The engineering terminal 4 is used for, for example, activation, maintenance, operation, and the like of the control stations 3. For example, the engineering terminal 4 is used when performing setting, software update (one example of offline operation to be described later), and the like on the control stations 3.

The operation monitoring terminal 5 monitors the plant 1 on the basis of data from the control stations 3, user operation, or the like. For example, the operation monitoring terminal 5 receives alarms indicating abnormalities related to the control stations 3 and provides the alarms to a user (operator or the like) of the operation monitoring terminal 5. Hereinafter, the alarms indicating abnormalities related to the control stations 3 may simply referred to as "alarms".

In the present embodiment, the operation monitoring terminal 5 has a function as an information collection apparatus that collects (acquires or the like) information to be supplied for investigation of a cause of an alarm (characteristics, analysis, observational study, or the like of the cause). Hereinafter, the information as described above may be simply referred to as "investigation information", "alarm investigation information", or the like.

Figure 2:
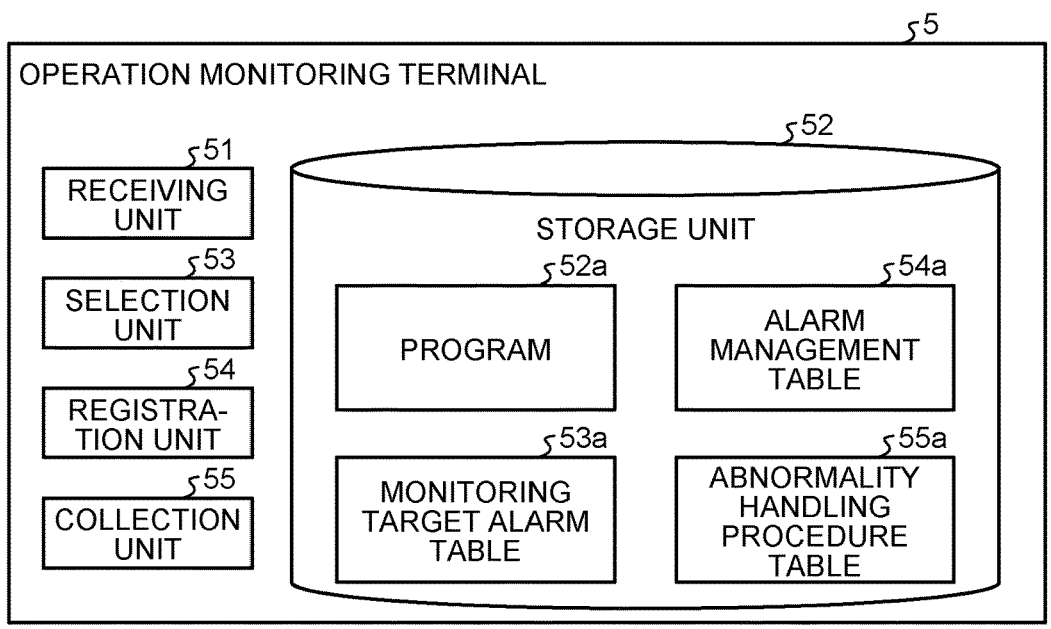
FIG. 2 is a diagram illustrating an example of a schematic configuration of an operation monitoring terminal.

FIG. 2 is a diagram illustrating an example of a schematic configuration of the operation monitoring terminal. The operation monitoring terminal 5 includes a receiving unit 51, a storage unit 52, a selection unit 53, a registration unit 54, and a collection unit 55. More specifically, the receiving unit 51 receives alarms from the control stations 3. The storage unit 52 stores therein information that is needed for a process performed by the operation monitoring terminal 5. The selection unit 53 selects an alarm from among the alarms received by the receiving unit 51. The registration unit 54 registers the alarm selected by the selection unit 53. The collection unit 55 collects the investigation information on the alarm registered by the registration unit 54. Registration of the alarm and collection of the investigation information are performed by using data transfer through the control bus. Each of the units will be described in detail below.

The receiving unit 51 receives an alarm. The alarm includes, for example, an alarm ID (No) and a message content that describes contents of the alarm. In one embodiment, the alarm is identified by a combination of part information and location information. The part information indicates a type of a part of the control station 3. The location information indicates a location of the part of the control station 3. Hereinafter, a combination of the part information and the location information will be referred to as an "arbitration".

Figure 3:
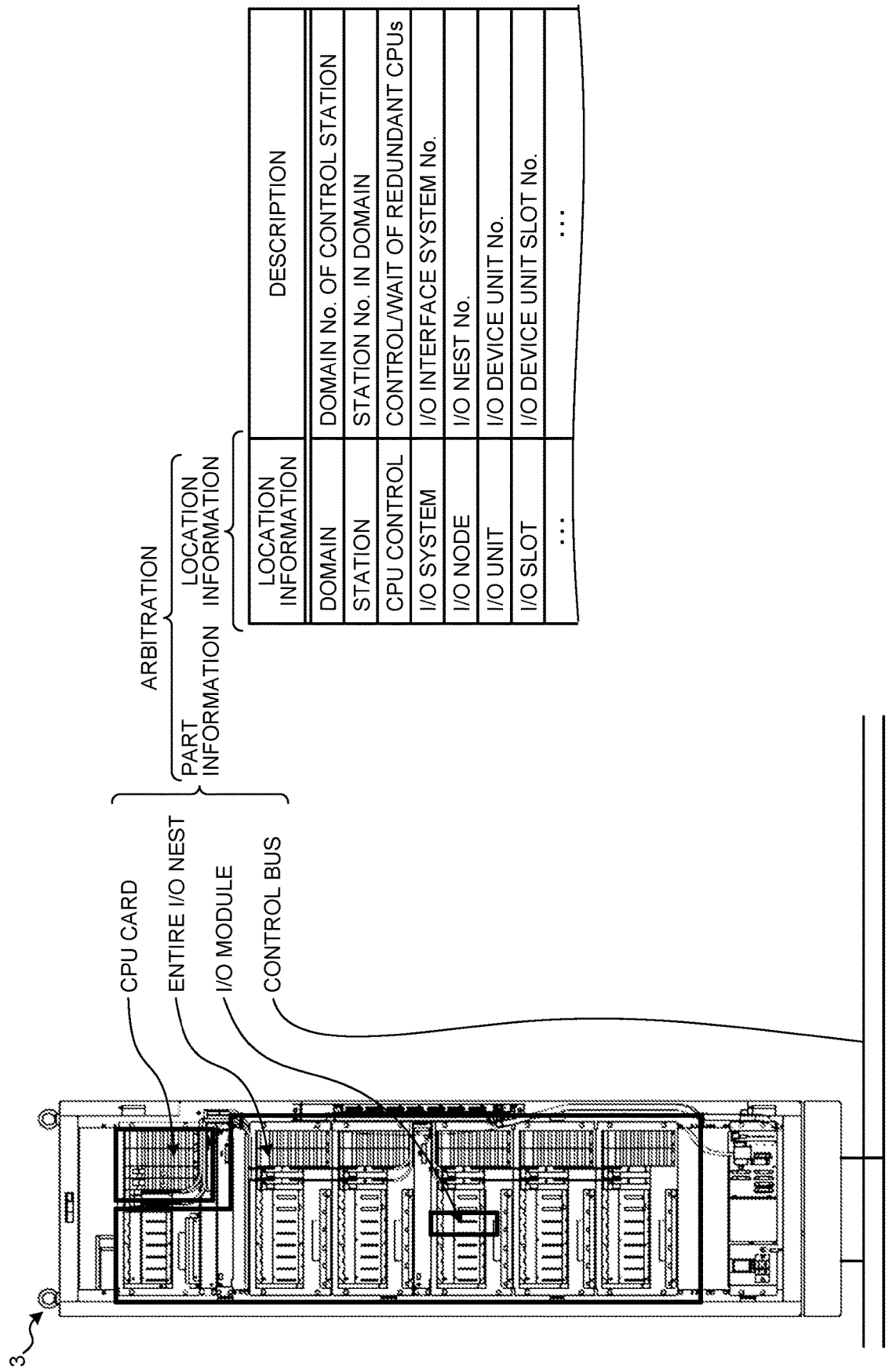
FIG. 3 is a diagram illustrating an example of an arbitration.

FIG. 3 is a diagram illustrating an example of the arbitration. On the left side in FIG. 3, an example of an exterior of the control station 3 is illustrated, and a "central processing unit (CPU) card", an "entire input/output (I/O) nest", an "I/O module", and a "control bus" are illustrated among pieces of the part information indicating types of the respective parts.

The part information of the "CPU card" is information indicating a CPU card in the control station 3. Meanwhile, in the following, the CPU card may be simply referred to as a "CPU". The CPU performs an arithmetic process or the like that is needed to control the plant 1. From the viewpoint that it is important to prevent a defect, such as lack, in control of the plant 1, the control station 3 includes a plurality of CPUs to have redundant (for example, duplicated) CPUs. One of the duplicated CPUs operates and the other one of the CPUs waits. If an abnormality occurs in the operating CPU, an alarm indicating the abnormality is generated, and the waiting CPU is switched to the operating CPU.

The part information of the "entire I/O nest" is information indicating the entire I/O nest in the control station 3. The I/O nest includes a plurality of I/O modules.

The part information of the "I/O module" is information indicating an I/O module (I/O device unit) in the control station 3. The I/O module performs input and output of various kinds of data used to control the control station 3. Examples of the input data include data from the field instrument 2 and data from the control bus (from the operation monitoring terminal 5 or the like). Examples of the output data include data to the field instrument 2 and data to the control bus (to the operation monitoring terminal 5 or the like).

The part information of the "control bus" is information indicating the control bus to which the control station 3 is connected. The part information of the "control bus" may be information indicating the control bus (the entire control bus) or may be information indicating only a part of the control bus to which the control station 3 is connected. FIG. 3 schematically illustrates two communication paths of the duplicated control buses.

On the right side of FIG. 3, a "domain", a "station", "CPU control", an "I/O system", an "I/O node", an "I/O unit", and an "I/O slot" among pieces of the location information indicating locations of the parts of the control station 3 are illustrated.

The location information of the "domain" is information indicating a location of the domain (the domain D1, the domain D2, or the like in FIG. 1) of the control bus. In this example, the location information of the "domain" is represented by a number (domain No).

The location information of the "station" is information indicating a location of the control station 3 in the domain. In this example, the location information of the "station" is represented by a number (station No).

The location information of the "CPU control" is information indicating locations of the operating CPU and the waiting CPU between the redundant CPUs in the control station 3. In this example, the location information of the "CPU control" is represented by any of the operating (controlling) CPU and the waiting CPU (control/wait of the redundant CPUs).

The location information of the "I/O system" is information indicating a location of an I/O system in the control station 3. In this example, the location information of the "I/O system" is represented by a number (I/O interface system No).

The location information of the "I/O node" is information indicating a location of the I/O nest in the control station 3. In this example, the location information of the "I/O node" is represented by a number (I/O nest No).

The location information of the "I/O unit" is information indicating a location of the I/O device unit in the control station 3. In this example, the location information of the "I/O unit" is represented by a number (I/O device unit No).

The location information of the "I/O slot" is information indicating a slot of the I/O device unit in the control station 3. In this example, the location information of the "I/O slot" is represented by a number (I/O device unit slot No).

For example, the part information and the location information as described above are appropriately combined as long as there is no contradiction, and constitute the arbitration. Examples of the arbitration include a combination the part information of the "CPU" and the location information of the "CPU control", a combination of the part information of the "entire I/O nest" and the location information of the "domain" and the "station", and a combination of the part information of the "I/O module" and the location information of the "domain", the "station", the "I/O system", the "I/O node", the "I/O unit", and the "I/O slot".

In addition to the part information and the location information illustrated in FIG. 3, various kinds of information indicating types of the parts of the control station 3 may be handled as the part information and various kinds of information indicating locations of the parts of the control station 3 may be handled as the location information.

Examples of use of the arbitration will be described below. As described above, the arbitration may be used to identify an alarm. For example, a correspondence relationship between the alarm (the alarm ID, the message content, or the like) and the arbitration is determined in advance, and the alarm is identified by the arbitration on the basis of the correspondence relationship. Further, the arbitration may be used to identify a part of the control station 3. For example, which of the operating CPU or the waiting CPU between the CPUs of the control station 3 is adopted is identified by a combination of the the part information of the "CPU" and the location information of the "CPU control".

Referring back to FIG. 2, the storage unit 52 stores therein various kinds of information needed for a process performed by the operation monitoring terminal 5. Examples of the information stored in the storage unit 52 include a program 52*a*, a monitoring target alarm table 53*a*, an alarm management table 54*a*, and an abnormality handling procedure table 55*a*. The program 52*a* is a program (information collection program) that causes a computer to perform a process of the operation monitoring terminal 5 (information collection apparatus). The monitoring target alarm table 53*a*, the alarm management table 54*a*, and the abnormality handling procedure table 55*a* will be described in detail later.

The selection unit 53 selects a monitoring target alarm from alarms received by the receiving unit 51. It is often the case that the alarms received by the receiving unit 51 include alarms for which a need to collect the investigation information is extremely low. For example, even if open-close operation of a valve is performed in an acceptable range of operation control in the plant 1, information indicating the operation may be generated as an alarm. There is little need to collect the investigation information on the alarm as described above. The selection unit 53 performs pre-selection (filtering) to eliminate the alarm as described above. The selection may be performed by, for example, referring to the monitoring target alarm table 53*a*.

Figure 4:
FIG. 4 is a diagram illustrating an example of a monitoring target alarm table.

FIG. 4 is a diagram illustrating an example of the monitoring target alarm table. In this example, the monitoring target alarm table 53*a* describes an "alarm", "monitoring necessity", and a "count time" in an associated manner.

The "alarm" is an alarm received by the receiving unit 51 and is schematically represented as an "alarm A" or the like in the drawing. The "monitoring necessity" indicates whether to adopt the alarm as a monitoring target, in particular, whether to adopt the alarm as an information collection target to be described later. An alarm for which the monitoring necessity indicates "needed" is adopted as a monitoring target. An alarm for which the monitoring necessity indicates "not needed" is not adopted as a monitoring target. In this example, the alarm A and the alarm B are adopted as monitoring targets. An alarm C is eliminated from a monitoring target.

The "count time" is used to eliminate several alarms. The principle of this will be described later. FIG. 4 illustrates a "delay time" and a "dead time" as the count times. In this example, the count time of the alarm A is the delay time and a length of the delay time is 20 seconds. The count time of the alarm B is the dead time and a length of the dead time is 30 seconds. Association of the count time with the alarm and setting of a specific length of the count time are appropriately performed as will be described later.

Elimination of an alarm by the count time will be described below. In some cases, a group of same alarms or alarms that are relevant with one another may be generated. If all pieces of investigation information on all of the alarms are collected, an amount of information increases and a percentage of information that is not beneficial (redundant information) increases. If the information that is not beneficial increases, it becomes difficult to identify a cause of an alarm, for example. Further, if the amount of information increases, an amount of data transferred through the control bus proportionally increases, so that a load on the control bus increases. As described above, high reliability is needed for the control bus, and therefore, it is necessary to reduce a load on the control bus as much as possible. In this sense, it is desirable to eliminate at least some alarms from the group of alarms as described above. Some examples of the group of alarms will be described below.

Examples of the group of alarms include alarms that are generated due to a failure in the CPU. For example, if the operating CPU is broken (fails), an alarm is generated, and the waiting CPU is switched to the operating CPU. The CPU that has failed performs self-diagnosis. In the self-diagnosis, it is confirmed whether the CPU is able to perform recovery (recover) from the failure. If recovery is possible, the CPU that has failed serves as the waiting CPU, and duplication of the CPUs is maintained. Through the self-diagnosis as described above, chattering in which the CPU repeatedly fails and recovers may occur. The same alarm is generated every time a failure and a recovery are repeated. The alarms that are repeatedly generated as described above are alarms in the same group that is generated due to the failure in the CPU. The same alarms may be identified in association with the same arbitration. The same arbitration in this example is a combination of the part information of the "CPU" and the location information of the "CPU control".

As for the group of alarms that are generated by the chattering as described above, it is efficient to collect the investigation information on one of the alarms and eliminate the other alarms. Further, it is desirable to collect the investigation information after the chattering is adequately reduced and the CPU operation is stabilized. For example, it is preferable to start to collect the investigation information on the alarm after a lapse of a predetermined time since reception of the alarm by the receiving unit 51. The predetermined time may be determined based on a period taken until the chattering is adequately reduced. The delay time is used to eliminate the alarm as described above. The delay time is set as a count time for delaying collection of the investigation information on the corresponding alarm.

Other examples of the group of alarms include an alarm that is generated due to offline operation (offline engineering operation). The offline operation is, for example, operation including reset of the control station 3, and the operation control on the plant 1 by the control station 3, for example, communication with the field instruments 2 or the like, is stopped. Examples of the offline operation include software update of the control station 3. By the offline operation, for example, various alarms indicating abnormalities of the respective parts of the control station 3 are generated. For example, with respect to the I/O module, an alarm with a message content indicating a start of download of a database to the I/O module is generated. With an influence of this, an alarm indicating an abnormality of the I/O module is generated. With respect to the CPU, an alarm indicating stop of the control station or the like is generated. With an influence of this, an alarm indicating a breakage (failure) of the control station 3 is generated. The alarms as described above are a group of alarms that are generated due to the offline operation and that are relevant with one another.

It is efficient not to collect (or it is efficient to eliminate) investigation information on the group of alarms that are generated due to the offline operation and that are relevant with one another as described above. This is because it is clear that a cause of the alarms is the offline operation. As will be described later, the alarms as described above can be eliminated by the dead time. The dead time is a count time for neglecting the alarms that are relevant with one another. Details of the dead time will be described later.

Other examples of the group of alarms include alarms that are generated due to an abnormality of a specific part of the control station 3. More specifically, if some of parts (affected parts) have failed due to an influence of the abnormality of the specific part, alarms that are generated for the affected parts are a group of alarms that are relevant with one another. For example, as recovery alarms for a failure of the control station (caused by an abnormality of the CPU), alarms, such as reset and start, automatic reset and start, energization initialization start, and energization continuation start of the control station, are generated. With an influence of this, alarms indicating an abnormality of a bus that connects the I/O unit and the CPU, an abnormality of the I/O module, and the like are generated. These alarms are a group of alarms that are generated due to the offline operation and that are relevant with one another. These alarms are a group of alarms that are generated for the affected parts (for example, the I/O unit, the I/O module, and the like) that are affected by the abnormality of the specific part (for example, the CPU) and that are relevant with one another.

It is efficient not to collect the investigation information on the group of alarms that are generated due to abnormalities of the affected parts and that are relevant with one another. This is because it is sufficient to collect the investigation information on the alarm for the specific part. As will be described later, the alarms as described above are also eliminated by the dead time.

The monitoring target alarm table 53a associates the delay time with the group of same alarms (for example, alarms that are generated due to a failure in the CPU) as described above. Specific details, such as a length of the delay time to be associated with each of the alarms, may be appropriately set in accordance with actual alarm generation operation. For example, the delay time for ensuring a certain length of a period including generation of a group of alarms that are caused by a failure in the CPU (a time needed to adequately reduce chattering or the like) may be set.

The monitoring target alarm table 53a associates the dead time with the group of alarms that are relevant with one another (for example, alarms that are generated due to offline operation, an abnormality of a specific part, or the like) as described above. Specific details, such as a length of the dead time to be associated with each of the alarms, may be appropriately set in accordance with actual alarm generation operation. For example, a dead time for ensuring a certain length of a period including generation of a group of alarms that are caused by offline operation or for ensuring a certain length of a period including generation of a group of alarms indicating abnormalities of affected parts caused by an abnormality of a specific part may be set.

Referring back to FIG. 2, the registration unit 54 registers the alarm selected by the selection unit 53. More specifically, the registration unit 54 registers an alarm, an arbitration, and a count time in the alarm management table 54a in an associated manner.

Figure 5:
FIG. 5 is a diagram illustrating an example of an alarm management table.

FIG. 5 is a diagram illustrating an example of the alarm management table. In this example, the alarm management table 54a describes an "alarm", an "arbitration", "control", and a "count time" in an associated manner. The alarm and the arbitration are the same as described above.

The "control" indicates whether the count time is the delay time or the dead time. The control of "ON" indicates that the count time is the dead time. The control of "OFF" indicates that the count time is the delay time.

The "count time" indicates a remaining time of the count time that is counted down. In this example, a remaining time of the count time (delay time) of the alarm A is 20 seconds and a remaining time of the count time (dead time) of the alarm B is 30 seconds.

Referring back to FIG. 2, the registration unit 54 registers the same alarm as the alarm which is registered in the alarm management table 54a and for which the delay time is being counted down, in the alarm management table 54a in an overwriting manner. By the overwriting registration, the alarm that has been registered is deleted (eliminated) from the alarm management table 54a. The delay time being counted down is reset (for example, returned to 20 seconds). Here, the same alarms may be identified in association with the same arbitration. In this case, the registration unit 54 registers an alarm with the same arbitration as the arbitration of the alarm which is registered in the alarm management table 54a and for which the delay time is being counted down, in the alarm management table 54a in an overwriting manner.

The registration unit 54 does not register (eliminates), in the alarm management table 54a, an alarm that is relevant with the alarm which is registered in the alarm management table 54a and for which the dead time is being counted down. Here, the alarms that are relevant with one another may be identified in association with arbitrations that are relevant with one another. In this case, the registration unit 54 does not register, in the alarm management table 54a, an alarm with an arbitration that is relevant with the arbitration of the alarm which is registered in the alarm management table 54a and for which the dead time is being counted down.

The collection unit 55 reads the alarm that is received by the receiving unit 51, in particular, the alarm that is selected by the selection unit 53 and that is registered in the alarm management table 54a by the registration unit 54, on an as-needed basis, and collects investigation information on the read alarm.

As described above, the count time is counted down for the alarm that is registered in the alarm management table 54a. The collection unit 55 does not collect the investigation information on the alarm which is registered in the alarm management table 54a and for which the count time is being counted down. It can be said that the count time gives a period for suspending collection of the investigation information on the alarm.

The collection unit 55 collects the investigation information on the alarm for which the countdown of the count time is completed, on an as-needed basis.

Specifically, the collection unit 55 collects the investigation information on the alarm for which the countdown of the delay time is completed. In other words, the collection unit 55 starts to collect the investigation information on the alarm received by the receiving unit 51 after a lapse of a predetermined time since reception of the alarm. In contrast, the collection unit 55 does not collect the investigation information on the alarm for which the countdown of the dead time is completed.

The collection unit 55 collects the investigation information from a corresponding part of the control station 3. The corresponding part of the control station 3 is identified on the basis of the alarm (for example, the alarm ID and/or the message content), and in particular, identified by a collection procedure that is associated with the alarm in the abnormality handling procedure table 55a, for example. The collection unit 55 collects the investigation information with reference to the abnormality handling procedure table 55a.

Figures 6, 7:
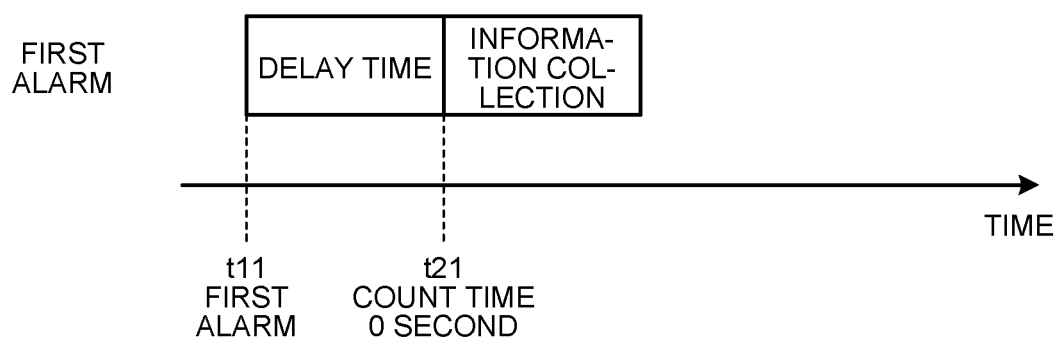
FIG. 6 is a diagram illustrating an example of an abnormality handling procedure table.
FIG. 7 is a diagram illustrating an example of information collection based on countdown of a count time.

FIG. 6 is a diagram illustrating an example of the abnormality handling procedure table. In this example, the abnormality handling procedure table 55a describes an "alarm" and a "collection procedure" in an associated manner.

The "collection procedure" is information that describes a procedure for collecting the investigation information, and is schematically represented as a "collection procedure A" and the like in the drawing. In this example, the collection procedure A represents a procedure for collecting the investigation information on the alarm A, and a collection procedure B represents a procedure for collecting the investigation information on the alarm B. The collection procedure includes, for example, activation of an execution file for acquiring desired investigation information from a part of the control station 3 that is a target for information collection, or the like. The collection procedure may include sequential activation of a plurality of different execution files (a plurality of procedures), or the like. For example, corresponding execution files are activated in order from the largest part (for example, the control bus) to the smallest part among the parts of the control station 3, and pieces of investigation information are collected.

The pieces of investigation information on several alarms among the alarms for which the countdown of the count time is completed are collected as described above, for example. Examples of operation related to the above will be described below with reference to FIG. 7 to FIG. 11.

FIG. 7 to FIG. 11 are diagrams illustrating examples of information collection based on the countdown of the count time. In the example illustrated in FIG. 7, the same alarm (alarm with the same arbitration) is generated only once with respect to the delay time. At a time t11, an alarm (first alarm) is first received and registered together with the delay time. Countdown of the delay time is started. At a time t21, the countdown of the delay time is completed and information collection is started.

Figure 8:
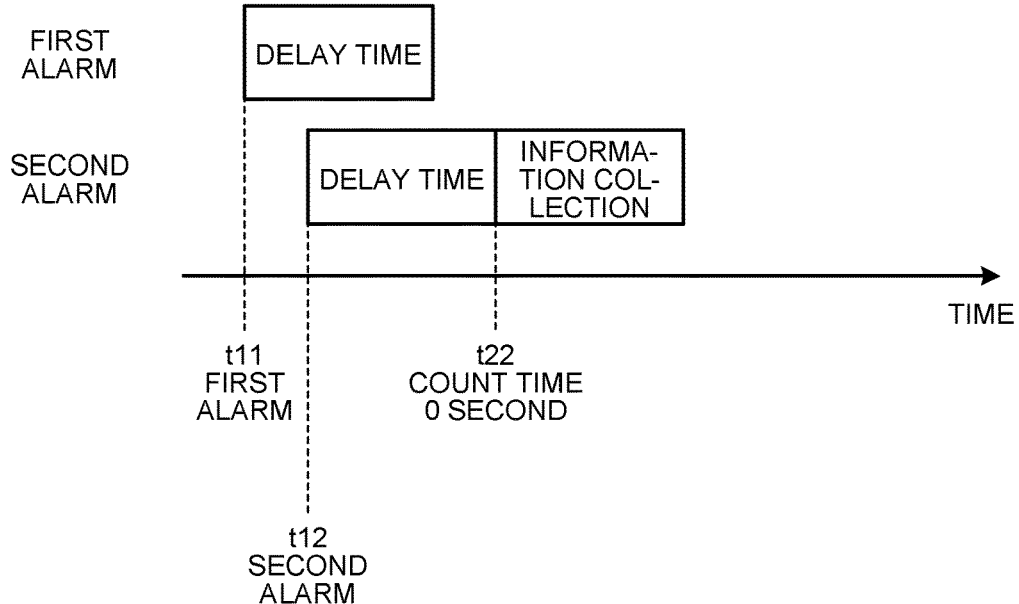
FIG. 8 is a diagram illustrating an example of information collection based on the countdown of the count time.

In the example illustrated in FIG. 8, the same alarms are generated twice with respect to the delay time. At the time t11, an alarm (first alarm) is first received and registered together with the delay time. Countdown of the delay time is started. At a time t12 before completion of the countdown of the delay time, an alarm (second alarm) is secondly received and the delay time is reset. The first alarm is eliminated (cancelled), and the second alarm is registered together with the delay time. At a time t22, the countdown of the delay time is completed and collection of the investigation information on the second alarm is started.

Figure 9:
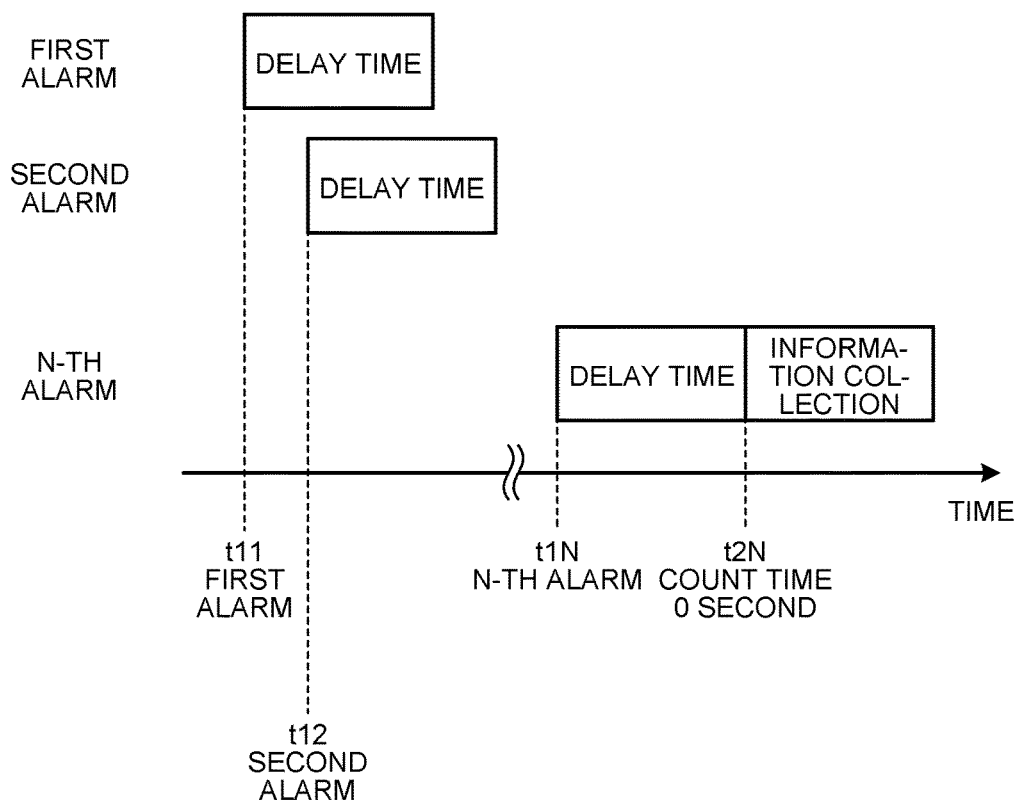
FIG. 9 is a diagram illustrating an example of information collection based on the countdown of the count time.

In the example illustrated in FIG. 9, the same alarms are generated N times with respect to the delay time. N is an integer equal to or larger than 2. At the time t11, an alarm (first alarm) is first received and registered together with the delay time. Countdown of the delay time is started. At the time t12 before completion of the countdown of the delay time, an alarm (second alarm) is secondly received and the delay time is reset. The first alarm is eliminated and the second alarm is registered together with the delay time. At a time t1N before completion of the countdown of the delay time, an alarm (N-th alarm) is received for the N-th time and the delay time is reset. The second alarm is eliminated and the N-th alarm is registered together with the delay time. At a time t2N, the countdown of the delay time is completed, and collection of the investigation information on the N-th alarm is started.

Figure 10:
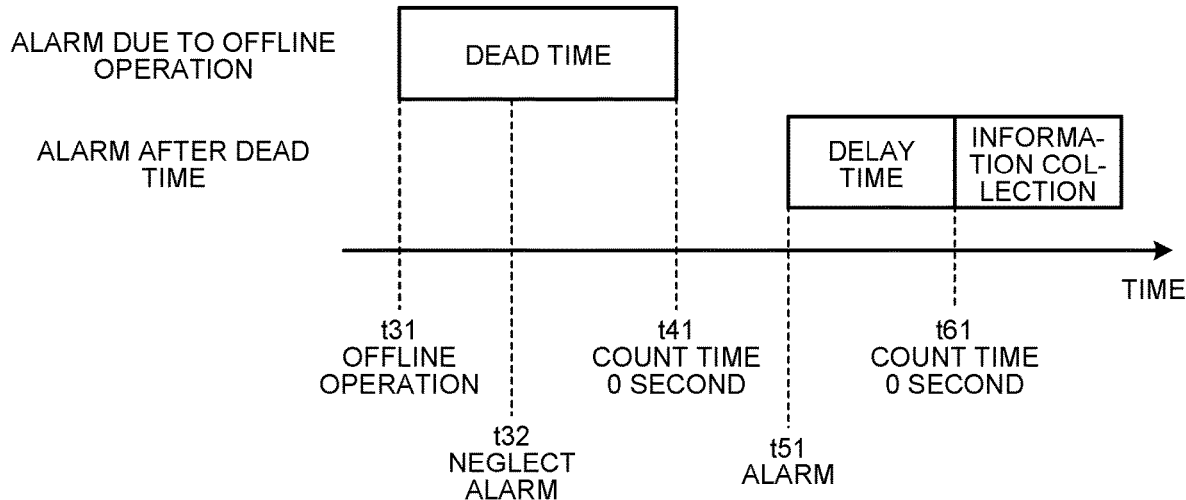
FIG. 10 is a diagram illustrating an example of information collection based on the countdown of the count time.

In the example illustrated in FIG. 10, several alarms are generated due to offline operation with respect to the dead time, but pieces of investigation information on the alarms are not collected (the alarms are eliminated). At a time t31, an alarm that is generated by the offline operation (offline operation message) is received and registered. Countdown of the dead time is started. At a time t32 before completion of the countdown of the dead time, an alarm that is generated due to (in association with) the previous offline operation is received but neglected (eliminated). In other words, the alarm is not registered in the alarm management table 54a. At a time t41, the countdown of the dead time is completed, and the alarm that is generated at the time t31 is also eliminated. The same applies to alarms that are subsequently generated (alarms after the dead time). In this example, an alarm is received and registered at a time t51. At a time t61, countdown of the delay time is started. The countdown of the delay time is completed, and thereafter collection of the investigation information on the alarm is started.

Figure 11:
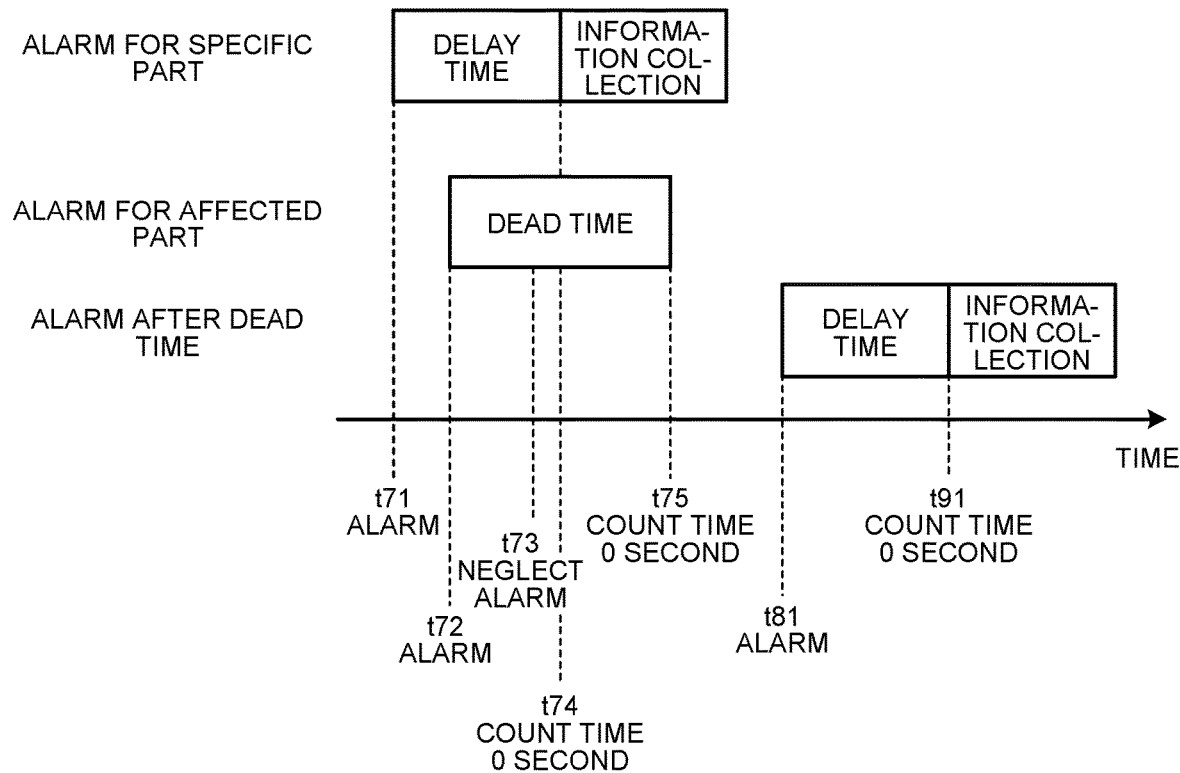
FIG. 11 is a diagram illustrating an example of information collection based on the countdown of the count time.

In the example illustrated in FIG. 11, alarms for several affected parts that are caused by the alarm of a specific part of the control station 3 are generated with respect to the dead time, but pieces of investigation information on the alarms of the affected parts are not collected (the alarms are eliminated). At a time t71, an alarm of the specific part is received and registered together with the delay time. Countdown of the delay time is started. At a time t72, an alarm of an affected part is received and registered together with the dead time. At a time t73 before an end of the dead time, an alarm of an affected part is received but is neglected (eliminated). At a time t74, the countdown of the delay time is completed, and collection of the investigation information on the alarm of the specific part is started. At a time t75, the countdown of the dead time is completed, and the alarm that is generated at the time t72 is also eliminated. The same applies to alarms that are subsequently generated (alarms after the dead time). In this example, at a time t81, an alarm of a different part is received and registered. At a time t91, countdown of the delay time is started. The countdown of the delay time is completed, and thereafter collection of the investigation information on the alarm is started.

As described above for example, with use of the delay time or the dead time, at least some alarms in a group of same alarms or alarms that are relevant with one another are eliminated. The collection unit 55 is able to effectively collect useful investigation information.

Referring back to FIG. 2, the collection unit 55 may include a graphical user interface (GUI) for providing (displaying or the like) the collected investigation information to a user. For example, the collected investigation information may be provided by being narrowed down in accordance with user operation. Examples of the narrowing down include narrowing down by an alarm type, the arbitration, or the like. Furthermore, information on the alarms that are eliminated without being adopted as a target for which the investigation information is to be collected by the collection unit 55 among the the alarms that are received by the receiving unit 51, in particular, among the alarms that are selected by the selection unit 53 and registered by the registration unit 54, may be provided by the GUI. The information provided as described above may be provided for, for example, examination of reasonability of elimination of the alarms.

Figure 12:
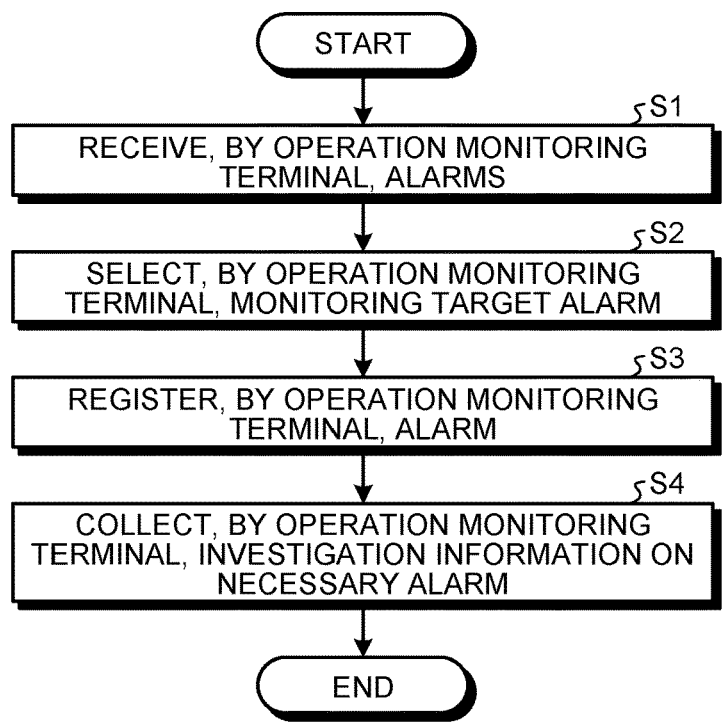
FIG. 12 is a flowchart illustrating an example of processes performed by the operation monitoring terminal.
Figure 13:
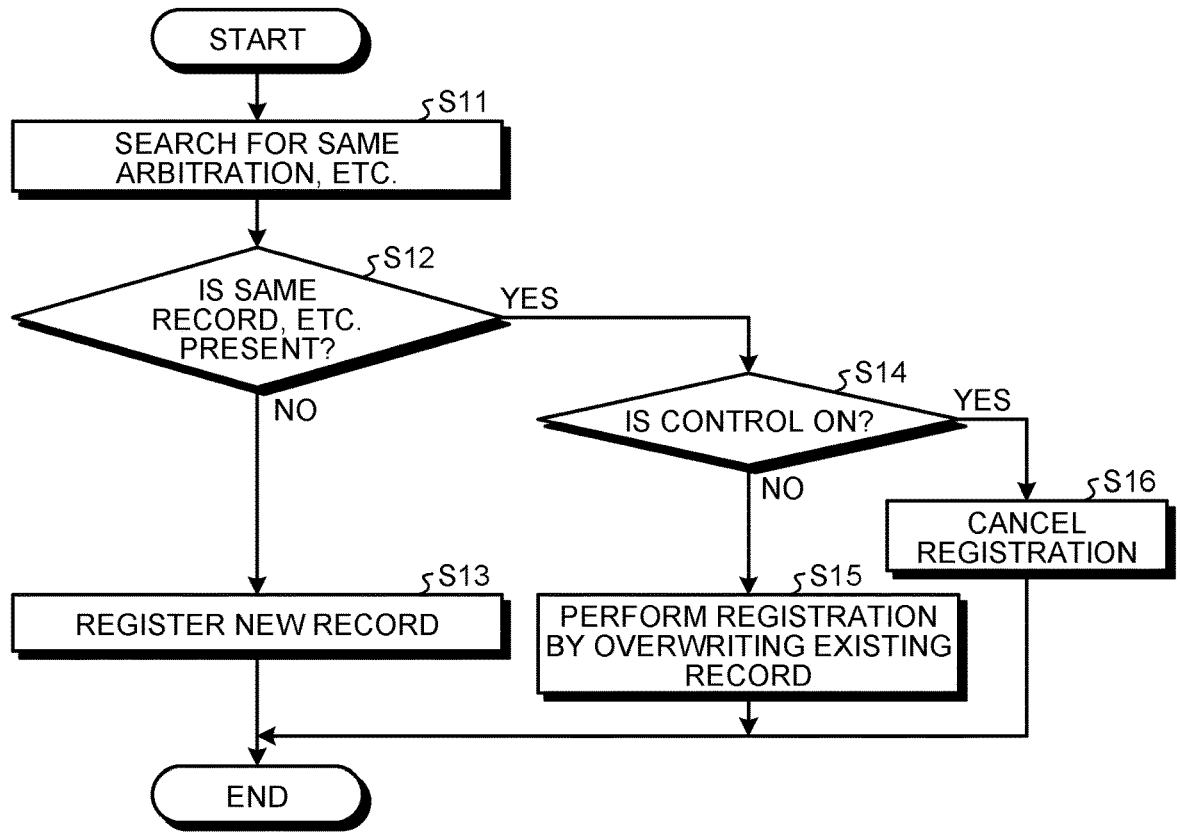
FIG. 13 is a flowchart illustrating an example of processes performed by the operation monitoring terminal.
Figure 14:
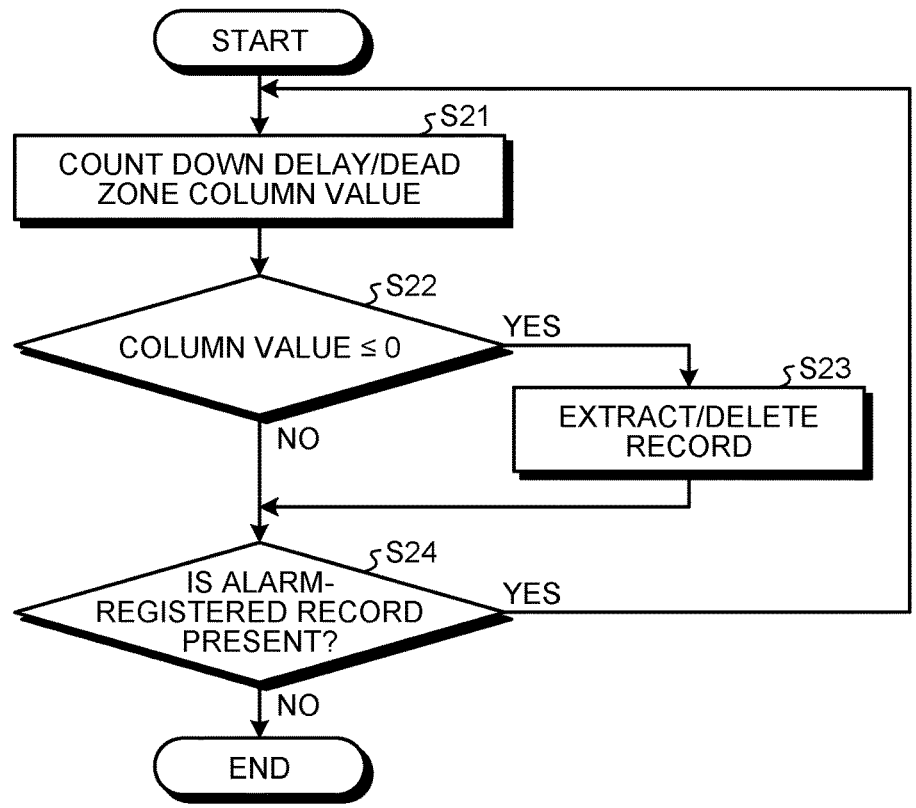
FIG. 14 is a flowchart illustrating an example of processes performed by the operation monitoring terminal.

FIG. 12 to FIG. 14 are flowcharts illustrating examples of processes (operation monitoring method (information collection method)) performed by the operation monitoring terminal.

FIG. 12 illustrates an example of some processes from reception of alarms to collection of the investigation information. Detailed processes are the same as those as described above, and therefore, the same explanation will not be repeated.

At Step S1, the operation monitoring terminal receives alarms. As described above, the receiving unit 51 of the operation monitoring terminal 5 receives the alarms.

At Step S2, the operation monitoring terminal selects a monitoring target alarm. As described above, the selection unit 53 of the operation monitoring terminal 5 refers to the monitoring target alarm table 53a and selects the monitoring target alarm from among the alarms that are received by the receiving unit 51 at Step S1. The count times or the like are also associated with the alarms.

At Step S3, the operation monitoring terminal registers the alarm. As described above, the registration unit 54 of the operation monitoring terminal 5 registers, in the alarm management table 54a, the alarm that is selected by the selection unit 53 at Step S2. The arbitration, the count time, and the like are also registered.

At Step S4, the operation monitoring terminal collects the investigation information on a necessary alarm. As described above, the collection unit 55 of the operation monitoring terminal 5 registers the investigation information on a specific alarm (for example, an alarm for which the countdown of the delay time is completed) among the alarms that are registered in the alarm management table 54a, from a certain part of the control station 3 that is identified on the basis of the alarm.

After the process at Step S4 is completed, the process in the flowchart is terminated.

FIG. 13 illustrates an example of a process of registering the alarm by the registration unit 54. This process is performed in response to operation of receiving alarms by the receiving unit 51 and selecting an alarm by the selection unit 53. In the following, an alarm that is received by the receiving unit 51 and selected by the selection unit 53 will be referred to as a "current alarm".

At Step S11, the same arbitration or the like is searched for. The registration unit 54 refers to the alarm management table 54a and searches for an alarm with an arbitration that is the same as or relevant with the arbitration of the current alarm.

At Step S12, it is determined whether the same record or the like is present. If the alarm management table 54a contains the alarm with the arbitration that is the same as or relevant with the arbitration of the current alarm, the registration unit 54 determines that the same record or the like is present. If the same record or the like is present (Step S12: Yes), the process goes to Step S14. In other cases (Step S12: No), the process goes to Step S13.

At Step S13, a new record is registered. The registration unit 54 additionally registers the current alarm in the alarm management table 54*a*.

At Step S14, whether the control is ON or not is determined. The registration unit 54 determines whether the control associated with the alarm with the arbitration that is the same as or relevant with the arbitration of the current alarm is ON. As described above, if the control is ON, the count time is the dead time. In other cases, the count time is the delay time. If the control is ON (Step S14: Yes), the process goes to Step S16. In other cases (Step S14: No), the process goes to Step S15.

At Step S15, registration is performed by overwriting an existing record. The registration unit 54 registers the current alarm together with the delay time in the alarm management table 54*a*, instead of the alarm that has been registered in the alarm management table 54*a*. The alarm that has been registered is deleted (eliminated) from the alarm management table 54*a* and the delay time is reset.

At Step S16, registration is cancelled. The registration unit 54 does not register (eliminates) the current alarm.

After the process at Step S13, Step S15, or Step S16 is completed, the process in the flowchart is terminated.

FIG. 14 illustrates an example of a process of reading the alarm that is registered in the alarm management table 54*a*. This process is appropriately repeated.

At Step S21, a delay/dead zone column value is counted down. In other words, the count time (the delay time or the dead time) of the alarm registered in the alarm management table 54*a* is counted down. This process is performed by, for example, the storage unit 52, the registration unit 54, or the collection unit 55.

At Step S22, it is determined whether the column value is equal to or smaller than zero. It is determined that the count time after performance of the countdown at Step S21 has reached 0. This process is performed by, for example, the storage unit 52, the registration unit 54, or the collection unit 55. If the column value is equal to or smaller than zero (Step S22: Yes), the process goes to Step S23. In other cases (Step S22: No), the process goes to Step S24.

At Step S23, the record is extracted or deleted. The collection unit 55 extracts the alarm for which the countdown of the delay time is completed from the alarm management table 54*a*, and collects the investigation information on the alarm. The collection unit 55 deletes (eliminates) the alarm for which the countdown of the dead time is completed from the registration unit 54, and does not collect the investigation information on the alarm. The deletion process may be performed by the storage unit 52 or the registration unit 54.

At Step S24, it is determined whether an alarm-registered record is present. It is determined whether an alarm that is registered in the alarm management table 54*a* is present. This process is performed by, for example, the storage unit 52, the registration unit 54, or the collection unit 55. If the alarm-registered record is present (Step S24: Yes), the process returns to Step S21. In other cases (Step S24: No), the process in the flowchart is terminated.

As described above for example, the operation monitoring terminal 5 automatically collects the investigation information on the alarm in accordance with the alarm from the control station 3. It is not necessary for an engineer to visit an actual site and collect the investigation information as conventionally done, so it is possible to effectively collect the investigation information. Further, with use of the countdown of the count times (the delay time and the dead time), it is possible to eliminate at least some alarms in a group of same alarms or alarms that are relevant with one another. Accordingly, it is possible to further improve the efficiency in collecting the investigation information.

Thus, one embodiment of the present disclosure has been described above. The disclosed technology is not limited to the embodiment as described above. Some modifications will be described below.

In the embodiment as described above, an alarm that is generated due to a failure of a part of the control station 3, offline operation, or the like has been described as an example of the alarm. However, embodiments are not limited to this example, and it is possible to cope with alarms that are generated due to various events. Examples of the other alarms include an alarm (also referred to as an alarm and event (A&E) or the like) in a programmable logic controller (PLC) for process automation (PA). The alarm for the PLC as described above may be identified by the arbitration as described above with reference to FIG. 3, and therefore, the alarm that is received accordingly may be a target for which the investigation information is to be collected by the operation monitoring terminal 5.

In the embodiment as described above, the example has been described in which the alarm and the count time are associated with each other by the monitoring target alarm table 53*a*. However, the count time and the alarm may be associated in various manners. An arbitrary functional block in the operation monitoring terminal 5 may associate the count time and the alarm at an arbitrary timing before registration of the alarm in the alarm management table 54*a*.

In the embodiment as described above, the example has been described in which the collection unit 55 collects the investigation information on the alarm that is selected by the selection unit 53 and registered by the registration unit 54 among the alarms that are received by the receiving unit 51. However, selection by the selection unit 53 and/or registration by the registration unit 54 are not always needed. For example, the operation monitoring terminal 5 need not include the selection unit 53. In this case, the collection unit 55 collects the investigation information on the alarm that is received by the receiving unit 51 and registered by the registration unit 54. The operation monitoring terminal 5 need not include the registration unit 54. In this case, the collection unit 55 collects the investigation information on the alarm that is received by the receiving unit 51 and selected by the selection unit 53. The operation monitoring terminal 5 need not include the selection unit 53 and the registration unit 54. In this case, the collection unit 55 collects the investigation information on the alarm received by the receiving unit 51.

In the embodiment as described above, the example has been described in which at least some alarms in a group of same alarms or alarms that are relevant with one another are eliminated by using the count time (the delay time and the dead time). However, a method of eliminating the alarms is not limited to this example. Modifications of the method will be described below with reference to FIG. 15 and FIG. 16.

Figure 15:
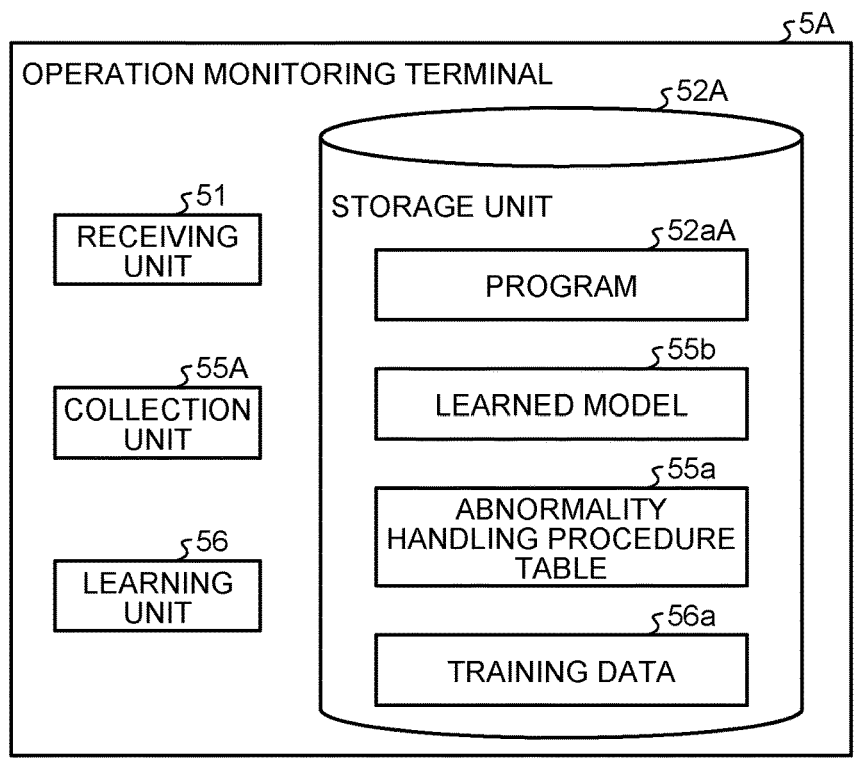
FIG. 15 is a diagram illustrating an example of a schematic configuration of an operation monitoring terminal according to a modification.

FIG. 15 is a diagram illustrating an example of a schematic configuration of an operation monitoring terminal according to a modification. An operation monitoring terminal 5A illustrated as an example is different from the operation monitoring terminal 5 (FIG. 2) in that the operation monitoring terminal 5A does not include the selection unit 53 and the registration unit 54, includes a storage unit 52A and a collection unit 55A instead of the storage unit 52 and the collection unit 55, and includes a learning unit 56.

The storage unit 52A is different from the storage unit 52 (FIG. 2) in that the storage unit 52A does not include the monitoring target alarm table 53a and the alarm management table 54a, includes a program 52aA instead of the program 52a, and includes a learned model 55b and training data 56a. The program 52aA is a program that causes a computer to perform a process of the operation monitoring terminal 5A.

The learned model 55b, if data (input data) corresponding to an alarm received by the receiving unit 51 is input, outputs data (output data) for identifying an alarm for which the investigation information is to be collected by the collection unit 55, for example. The "data corresponding to the alarm" may be, for example, data that is obtained by converting the alarm ID, the message content, or the like into a data format that is suitable as an input to the learned model 55b. The "data for identifying the alarm" may be, for example, data indicating a probability value of each of the alarms. An alarm with the highest probability may be identified as an alarm for which the investigation information is to be collected by the collection unit 55. The learned model 55b will be described below with additional reference to FIG. 16.

Figure 16:
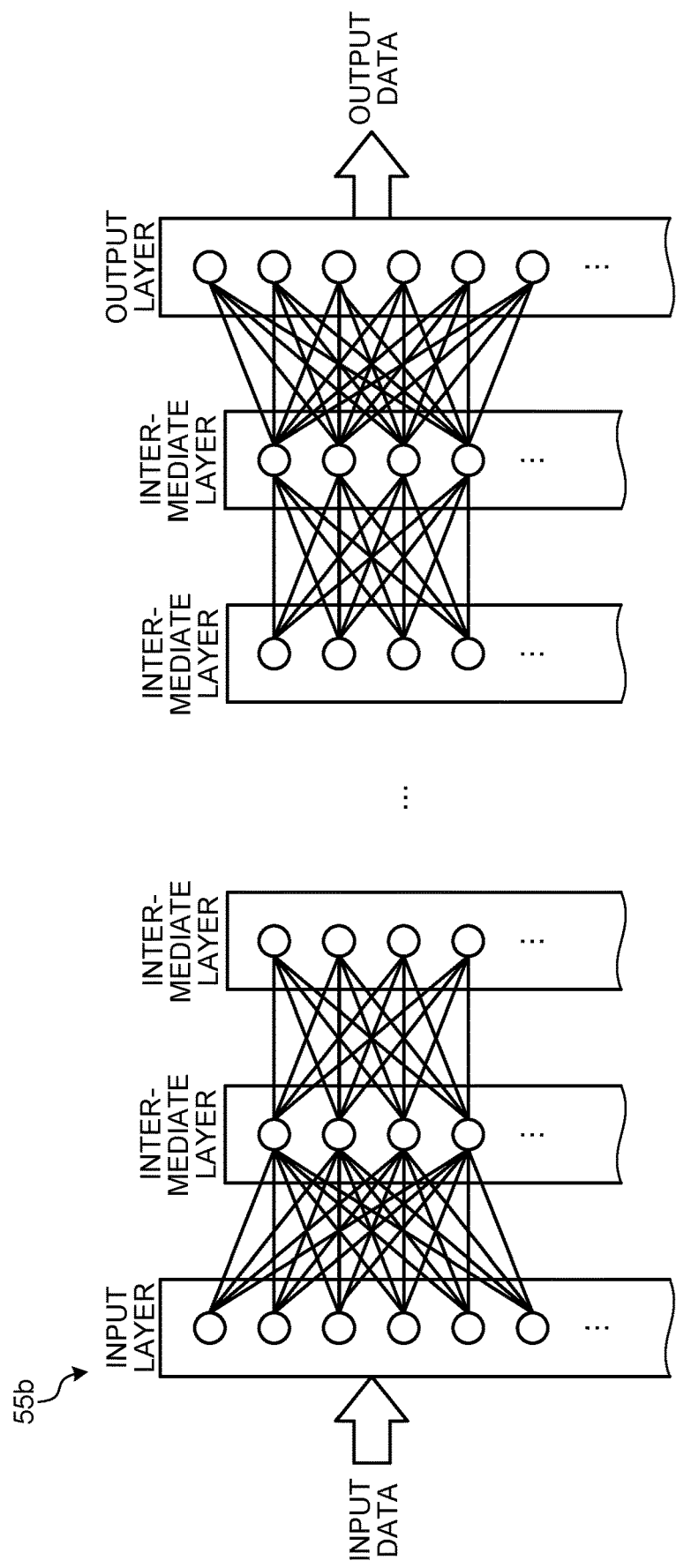
FIG. 16 is a diagram illustrating an example of a schematic configuration of a learned model.

FIG. 16 is a diagram illustrating an example of a schematic configuration of the learned model. In this example, the learned model 55b is a neural network including an input layer, a plurality of intermediate layers, and an output layer. Input data is input to the input layer. The output layer is, for example, an affine layer and outputs output data. The intermediate layers are arranged between the input layer and the output layer. Some neurons in each of the layers are schematically represented by white circles. Examples of the neural network include a deep Q-network (DQN). The principle of a learned model configured as described above is well known, and therefore, detailed explanation thereof will be omitted.

If data corresponding to the group of same alarms as described above is input, the learned model 55b may output data for identifying a single alarm in the group of same alarms. The input data may be chronological data of alarms that are received in a predetermined period. The learned model 55b may perform learning including setting of the predetermined period. The predetermined period corresponds to the delay time as described above. In other words, the learned model 55b implements the same function as the function to eliminate an alarm by the delay time.

If data corresponding to the group of alarms that are relevant with one another as described above is input, the learned model 55b may output data that does not identify any of the alarms in the group. The input data may be chronological data of alarms that are received in a predetermined period. The learned model 55b may perform learning including setting of the predetermined period. The predetermined period corresponds to the dead time as described above. In other words, the learned model 55b implements the same function as the function to eliminate an alarm by the dead time.

If the input data is input, the learned model 55b is trained (subjected to machine learning or the like) by using the training data 56a and generated so as to output the output data. Examples of the training data include a data set that is a combination of input data and output data. The data set as described above may be prepared by, for example, a user by using past alarms that are received by the operation monitoring terminal 5 and may be stored in the storage unit 52A.

Referring back to FIG. 15, the collection unit 55A collects the investigation information on an alarm that is identified by using a plurality of alarms received by the receiving unit 51 and by using the learned model 55b. Specifically, the collection unit 55A inputs data corresponding to the plurality of alarms received by the receiving unit 51 (may be chronological data as described above) to the learned model 55b. The learned model 55b outputs data for identifying an alarm for which the investigation information is to be collected among the plurality of alarms. The collection unit 55A refers to the abnormality handling procedure table 55a as described above for example, and collects the investigation information on the alarm that is identified by the learned model 55b.

According to the operation monitoring terminal 5A as described above, the learned model 55b implements the function to eliminate an alarm by the count time (the delay time and the dead time). Therefore, for example, the selection unit 53, the monitoring target alarm table 53a, the registration unit 54, the alarm management table 54a, and the like of the operation monitoring terminal 5 are not needed. Accordingly, it is possible to simplify the configuration of the operation monitoring terminal 5A and reduce a design cost related to setting of the count time and the like.

The learning unit 56 trains the learned model 55b by using the training data 56a that is stored in the storage unit 52A. Accordingly, it is possible to generate the learned model 55b, and it is further possible to update the learned model 55b through the training using the latest training data 56a every time the latest training data 56a based on the most recently received alarm or the like is prepared and stored in the storage unit 52A. Meanwhile, the learning unit 56 and the training data 56a may be arranged outside the operation monitoring terminal 5A (for example, in an information processing apparatus or the like (not illustrated)). In this case, the trained learned model 55b (for example, an adjusted DQN) that is generated outside the operation monitoring terminal 5A is provided to and used by the operation monitoring terminal 5A.

Figure 17:
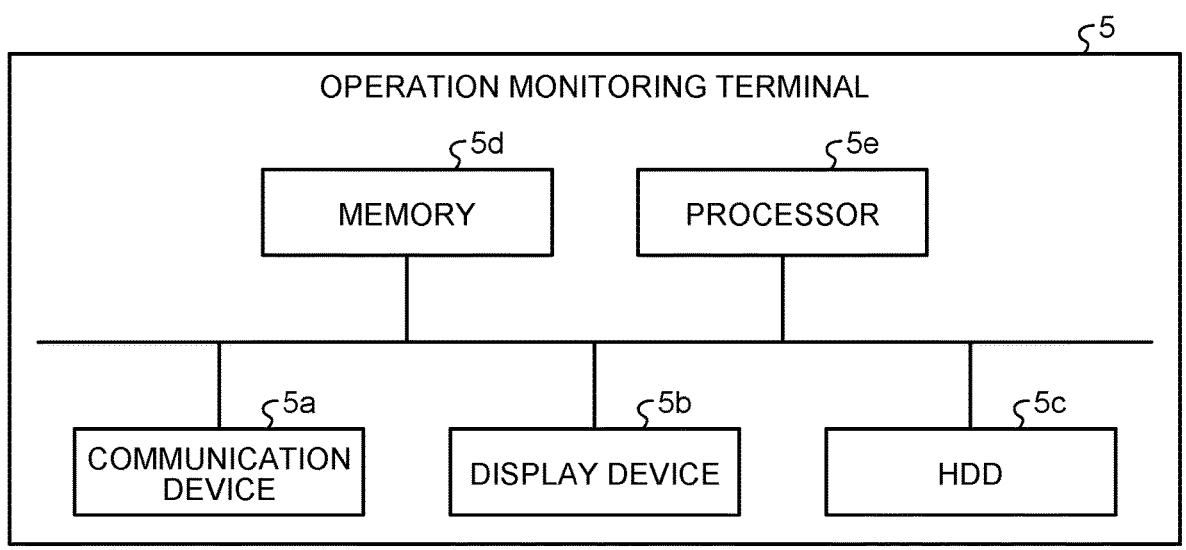
FIG. 17 is a diagram illustrating an example of a hardware configuration of the operation monitoring terminal.

FIG. 17 is a diagram illustrating an example of a hardware configuration of the operation monitoring terminal. A computer that has the hardware configuration illustrated herein or the like functions as the operation monitoring terminal 5 as described above. The hardware configuration illustrated herein includes a communication device 5a, a display device 5b, a hard disk drive (HDD) 5c, a memory 5d, and a processor 5e, all of which are connected to one another via a bus or the like.

The communication device 5a is a network interface card or the like and enables communication with other devices. The display device 5b is, for example, a touch panel, a display, or the like. The HDD 5c functions as the storage unit 52 and stores therein, for example, the program 52a (an operation monitoring program and the information collection program).

The processor 5e reads the program 52a from the HDD 5c or the like and loads the program 52a onto the memory 5d to thereby cause the computer to function as the operation monitoring terminal 5. The function includes the functions of the selection unit 53, the functions of the registration unit 54, and the functions of the collection unit 55 as described above.

The program 52a may be distributed via a network, such as the Internet. Further, the program 52a may be recorded in a computer-readable recording medium, such as a hard disk, a flexible disk (FD), a compact disc-read only memory (CD-ROM), a magneto-optical disk (MO), or a digital versatile disc (DVD), and may be executed by being read from the recording medium by the computer.

The apparatuses other than the operation monitoring terminal 5, such as the engineering terminal 4, may have the same hardware configuration as described above.

The operation monitoring terminal 5 (one example of the information processing apparatus) as described above may be identified as described below, for example. As described above with reference to FIG. 1, FIG. 2, etc., the operation monitoring terminal 5 includes the receiving unit 51 that receives an alarm indicating an abnormality related to the control station 3 that is for the plant 1, and the collection unit 55 that collects investigation information on a cause of the alarm from a part of the control station 3, where the part is identified based on the alarm received by the receiving unit 51.

According to the operation monitoring terminal 5 as described above, the investigation information on the alarm is automatically collected in accordance with the alarm from the control station 3. Therefore, it is possible to effectively collect the investigation information.

As described above with reference to FIG. 2, FIG. 6, etc., the collection unit 55 may collect the investigation information by referring to the abnormality handling procedure table 55*a* in which the alarm and a collection procedure for the investigation information are associated with each other. With this configuration for example, it is possible to collect the investigation information through an appropriate collection procedure.

The collection unit 55 may start to collect the investigation information on the alarm received by the receiving unit 51 after a lapse of a predetermined time since reception of the alarm. With this configuration, for example, it is possible to avoid collecting the information during instable operation (for example, chattering or the like) of the part of the control station 3 that may occur immediately after the alarm is generated, and it is possible to collect the investigation information at an appropriate timing at which the operation of the part is stabilized.

As described above with reference to FIG. 3 etc., the alarm may be identified in association with an arbitration that is a combination of the part information indicating a type of the part of the control station 3 and the location information indicating a location of the part. The part information may include at least one of information indicating the control bus that is connected to the control station 3, information indicating the CPU card in the control station 3, information indicating the entire I/O nest in the control station 3, and information indicating the I/O module in the control station 3. The location information may include at least one of information indicating locations of domains of the control bus that divides the plurality of control stations 3 by each of the domains (the domain D1 and the like), information indicating a location of the control station 3 in a domain (the domain D1 and the like), information indicating a location of one of the operating CPU and the waiting CPU between the redundant CPUs (CPU cards) in the control station 3, information indicating a location of the I/O system in the control station 3, information indicating a location of the I/O nest in the control station 3, information indicating a location of the I/O device unit in the I/O nest, and information indicating a location of a slot in the I/O device unit. The collection unit 55 may collect the investigation information from the part of the control station 3, where the part is identified based on the arbitration of the alarm received by the receiving unit 51. For example, by identifying the alarm by the arbitration as described above, it is possible to collect the investigation information on the alarm that is appropriately identified.

As described above with reference to FIG. 2, FIG. 5, etc., the operation monitoring terminal 5 includes the registration unit 54 that registers the alarm received by the receiving unit 51, the arbitration, and the count time in the alarm management table 54*a* in an associated manner, and the collection unit 55 need not collect the investigation information on the alarm which is registered in the alarm management table 54*a* and for which the count time is being counted down. With this configuration for example, it is possible to collect the investigation information at an appropriate timing as described above.

As described above with reference to FIG. 4, FIG. 5, FIG. 7 to FIG. 9, etc., the count time is the delay time for delaying collection of the investigation information on the corresponding alarm. The registration unit 54 registers the same alarm as the alarm which is registered in the alarm management table 54*a* and for which the delay time is being counted down in the alarm management table 54*a* in an overwriting manner, and resets the delay time being counted down after the registration. The collection unit 55 may collect the investigation information on the alarm for which the countdown of the delay time is completed. The same alarm is identified in association with the same arbitration, and the registration unit 54 may register an alarm with the same arbitration as the arbitration of the alarm which is registered in the alarm management table 54*a* and for which the delay time is being counted down in the alarm management table 54*a* in an overwriting manner. With use of the delay time as described above for example, it is possible to eliminate some alarms in the group of same alarms, and it is accordingly possible to further improve the efficiency in collecting the investigation information.

As described above with reference to FIG. 4, FIG. 5, FIG. 10, FIG. 11, etc., the count time is the the dead time for neglecting alarms that are relevant with each other. The registration unit 54 need not register, in the alarm management table 54*a*, an alarm that is relevant with the alarm which is registered in the alarm management table 54*a* and for which the dead time is being counted down, and the collection unit 55 need not collect the investigation information on the alarm for which the countdown of the dead time is completed. The alarms that are relevant with each other are identified in association with the arbitrations that are relevant with each other, and the registration unit 54 need not register, in the alarm management table 54*a*, an alarm with the arbitration that is relevant with the arbitration of the alarm which is registered in the alarm management table 54*a* and for which the dead time is being counted down. With use of the dead time as described above for example, it is possible to eliminate the group of alarms that are relevant with one another, and it is accordingly possible to further improve the efficiency in collecting the investigation information.

As described above with reference to FIG. 2 etc., the operation monitoring terminal 5 includes the selection unit 53 that selects the monitoring target alarm from among the alarms received by the receiving unit 51, and the registration unit 54 may register the alarm selected by the selection unit 53 in the alarm management table 54*a*. With this configuration, for example, it is possible to perform pre-selection (filtering) to eliminate an alarm for which there is little need to collect the investigation information.

As described above with reference to FIG. 15, FIG. 16, etc., the collection unit 55A may collect the investigation information on the alarm that is identified by using the plurality of alarms received by the receiving unit 51 and by using the learned model 55b, and if data corresponding to the plurality of alarms is input, the learned model 55b may output data for identifying an alarm for which the investigation information is to be collected. With use of the learned model 55b as described above, for example, it is possible to implement the function to eliminate an alarm by the count time (the delay time and the dead time).

The program 52a described above with reference to FIG. 2, FIG. 17, etc. is also one embodiment of the present disclosure. The program 52a causes a computer to perform a process of receiving an alarm indicating an abnormality related to the control station 3 that is for the plant 1, and collecting investigation information on a cause of the alarm from a part of the control station 3, where the part is identified based on the received alarm. Even with use of the program 52a as described above, it is possible to effectively collect the investigation information as described above. Furthermore, as described with reference to FIG. 17, and the like, the recording medium in which the program 52a is stored is one embodiment of the present disclosure.

The information collection method described above with reference to FIG. 12 etc. is also one embodiment of the present disclosure. The information collection method includes receiving, by the operation monitoring terminal 5 (one example of the information collection apparatus), an alarm indicating an abnormality related to the control station 3 that is for the plant 1 (Step S1), and collecting, by the operation monitoring terminal 5, investigation information on a cause of the alarm from a part of the control station 3, where the part is identified based on the received alarm (Step S4). Even with the information collection method as described above, it is possible to effectively collect the investigation information as described above.

What is claimed is:

1. An information collection apparatus comprising:
   a receiving unit that receive an alarm indicating an abnormality related to a control station that is for a plant; and
   a collection unit that collects investigation information on a cause of the alarm from a part of the control station, the part being identified based on the alarm received by the receiving unit, wherein
   the alarm is identified in association with an arbitration that is a combination of part information indicating a type of a part of the control station and location information indicating a location of the part,
   the part information includes at least one of
      information indicating a control bus that is connected to the control station,
      information indicating a central processing unit (CPU) card in the control station,
      information indicating an entire input/output (I/O) nest in the control station, and
      information indicating an I/O module in the control station,
   the location information includes at least one of
      information indicating locations of domains of a control bus that divides a plurality of control stations by each of the domains,
      information indicating a location of the control station in a domain, information indicating a location of one of an operating CPU and a waiting CPU between redundant CPUs in the control station,
      information indicating a location of an I/O system in the control station,
      information indicating a location of an I/O nest in the control station,
      information indicating a location of an I/O device unit in the I/O nest, and
      information indicating a location of a slot in the I/O device unit, and
   the collection unit collects the investigation information from a part of the control station, the part being identified based on the arbitration of the alarm received by the receiving unit.

2. The information collection apparatus according to claim 1, wherein the collection unit collects the investigation information by referring to an abnormality handling procedure table in which the alarm and an investigation information collection procedure are associated with each other.

3. The information collection apparatus according to claim 1, wherein the collection unit starts to collect the investigation information on an alarm received by the receiving unit after a lapse of a predetermined time since reception of the alarm.

4. The information collection apparatus according to claim 1, further comprising:
   a registration unit that registers the alarm received by the receiving unit, an arbitration, and a count time in an alarm management table in an associated manner, wherein
   the collection unit does not collect the investigation information on an alarm with an arbitration which is registered in the alarm management table and for which the count time is being counted down.

5. The information collection apparatus according to claim 4, wherein
   the count time is a delay time for delaying collection of the investigation information on a corresponding alarm,
   the registration unit registers a same alarm with an alarm which is registered in the alarm management table and for which the delay time is being counted down, in the alarm management table in an overwriting manner,
   the registration in an overwriting manner includes reset of the delay time being counted down, and
   the collection unit collects the investigation information on an alarm for which countdown of the delay time is completed.

6. The information collection apparatus according to claim 5, wherein
   the same alarm is identified in association with a same arbitration, and
   the registration unit registers an alarm with a same arbitration as an arbitration of an alarm which is registered in the alarm management table and for which the delay time is being counted down, in the alarm management table in an overwriting manner.

7. The information collection apparatus according to claim 4, wherein
   the count time is a dead time for neglecting alarms that are relevant with each other,
   the registration unit does not register, in the alarm management table, an alarm that is relevant with an alarm which is registered in the alarm management table and for which the dead time is being counted down, and
   the collection unit does not collect the investigation information on an alarm for which countdown of the dead time is completed.

8. The information collection apparatus according to claim 7, wherein the alarms that are relevant with each other are identified in association with arbitrations that are relevant with each other, and the registration unit does not register, in the alarm management table, an alarm with arbitration relevant with the arbitration of the alarm which is registered in the alarm management table and for which the dead time is being counted down.

9. The information collection apparatus according to claim 4, further comprising:

a selection unit that selects a monitoring target alarm from alarms received by the receiving unit, wherein the registration unit registers the alarm selected by the selection unit in the alarm management table.

10. The information collection apparatus according to claim 1, wherein the collection unit collects the investigation information on an alarm that is identified by using a plurality of alarms received by the receiving unit and by using a learned model, and the learned model outputs data for identifying an alarm for which the investigation information is to be collected upon input of data corresponding to the plurality of alarms.

11. A non-transitory computer-readable recording medium having stored therein an information collection program that causes a computer to execute:

receiving an alarm indicating an abnormality related to a control station that is for a plant; and collecting investigation information on a cause of the alarm from a part of the control station, the part being identified based on the received alarm, wherein the alarm is identified in association with an arbitration that is a combination of part information indicating a type of a part of the control station and location information indicating a location of the part, the part information includes at least one of
information indicating a control bus that is connected to the control station,
information indicating a central processing unit (CPU) card in the control station,
information indicating an entire input/output (I/O) nest in the control station, and
information indicating an I/O module in the control station, the location information includes at least one of
information indicating locations of domains of a control bus that divides a plurality of control stations by each of the domains,
information indicating a location of the control station in a domain,
information indicating a location of one of an operating CPU and a waiting CPU between redundant CPUs in the control station,
information indicating a location of an I/O system in the control station,
information indicating a location of an I/O nest in the control station,
information indicating a location of an I/O device unit in the I/O nest, and
information indicating a location of a slot in the I/O device unit, and the investigation information is collected from a part of the control station, the part being identified based on the arbitration of the alarm received.

12. The non-transitory computer-readable recording medium according to claim 11, wherein the information collection program further causes the computer to execute:

registering the alarm received, an arbitration, and a count time in an alarm management table in an associated manner, wherein the investigation information is not collected on an alarm with an arbitration which is registered in the alarm management table and for which the count time is being counted down.

13. The non-transitory computer-readable recording medium according to claim 12, wherein the count time is a delay time for delaying collection of the investigation information on a corresponding alarm, the registering includes registering a same alarm with an alarm which is registered in the alarm management table and for which the delay time is being counted down, in the alarm management table in an overwriting manner, the registration in an overwriting manner includes reset of the delay time being counted down, and the collecting includes collecting the investigation information on an alarm for which countdown of the delay time is completed.

14. The non-transitory computer-readable recording medium according to claim 13, wherein the same alarm is identified in association with a same arbitration, and the registering includes registering an alarm with a same arbitration as an arbitration of an alarm which is registered in the alarm management table and for which the delay time is being counted down, in the alarm management table in an overwriting manner.

15. The non-transitory computer-readable recording medium according to claim 12, wherein the count time is a dead time for neglecting alarms that are relevant with each other, an alarm that is relevant with an alarm which is registered in the alarm management table and for which the dead time is being counted down is not registered in the alarm management table, and the investigation information is not collected on an alarm for which countdown of the dead time is completed.

16. An information collection method comprising:

receiving, by an information collection apparatus, an alarm indicating an abnormality related to a control station that is for a plant; and collecting, by the information collection apparatus, investigation information on a cause of the alarm from a part of the control station, the part being identified based on the received alarm, wherein the alarm is identified in association with an arbitration that is a combination of part information indicating a type of a part of the control station and location information indicating a location of the part, the part information includes at least one of
information indicating a control bus that is connected to the control station,
information indicating a central processing unit (CPU) card in the control station,
information indicating an entire input/output (I/O) nest in the control station, and
information indicating an I/O module in the control station, the location information includes at least one of information indicating locations of domains of a control bus that divides a plurality of control stations by each of the domains,
information indicating a location of the control station in a domain,
information indicating a location of one of an operating CPU and a waiting CPU between redundant CPUs in the control station,
information indicating a location of an I/O system in the control station,
information indicating a location of an I/O nest in the control station,
information indicating a location of an I/O device unit in the I/O nest, and
information indicating a location of a slot in the I/O device unit, and the information collection apparatus collects the investigation information from a part of the control station, the part being identified based on the arbitration of the alarm received.

17. The information collection method according to claim 16, further comprising:
registering the alarm received, an arbitration, and a count time in an alarm management table in an associated manner, wherein
the investigation information is not collected on an alarm with an arbitration which is registered in the alarm management table and for which the count time is being counted down.

18. The information collection method according to claim 17, wherein
the count time is a delay time for delaying collection of the investigation information on a corresponding alarm,
the registering includes registering a same alarm with an alarm which is registered in the alarm management table and for which the delay time is being counted down, in the alarm management table in an overwriting manner,
the registration in an overwriting manner includes reset of the delay time being counted down, and
the collecting includes collecting the investigation information on an alarm for which countdown of the delay time is completed.

19. The information collection method according to claim 18, wherein
the same alarm is identified in association with a same arbitration, and
the registering includes registering an alarm with a same arbitration as an arbitration of an alarm which is registered in the alarm management table and for which the delay time is being counted down, in the alarm management table in an overwriting manner.

20. The information collection method according to claim 17, wherein
the count time is a dead time for neglecting alarms that are relevant with each other,
an alarm that is relevant with an alarm which is registered in the alarm management table and for which the dead time is being counted down is not registered in the alarm management table, and
the investigation information is not collected on an alarm for which countdown of the dead time is completed.

* * * * *